(12) United States Patent
Combs

(10) Patent No.: US 10,173,663 B1
(45) Date of Patent: Jan. 8, 2019

(54) TOTAL ELECTRICAL VEHICLE

(71) Applicant: Cloyd J. Combs, Wimberley, TX (US)

(72) Inventor: Cloyd J. Combs, Wimberley, TX (US)

( * ) Notice: Subject to any disclaimer, the term of this patent is extended or adjusted under 35 U.S.C. 154(b) by 0 days.

(21) Appl. No.: 15/706,620

(22) Filed: Sep. 15, 2017

(51) Int. Cl.
B60L 8/00 (2006.01)
B60W 20/10 (2016.01)
B60L 7/10 (2006.01)
B60L 1/02 (2006.01)
B60L 11/18 (2006.01)
B60L 11/00 (2006.01)

(52) U.S. Cl.
CPC ............... *B60W 20/10* (2013.01); *B60L 1/02* (2013.01); *B60L 7/10* (2013.01); *B60L 8/003* (2013.01); *B60L 8/006* (2013.01); *B60L 11/005* (2013.01); *B60L 11/1809* (2013.01)

(58) Field of Classification Search
CPC .................................. B60L 8/00; B60K 16/00
See application file for complete search history.

(56) References Cited

U.S. PATENT DOCUMENTS 8,330,296 B2  12/2012  Ottman
8,371,401 B1 * 2/2013  Illustrato ................. H02S 10/12
                                              180/2.2
2003/0057915 A1 * 3/2003  Erkkila ..................... H02P 1/54
                                              318/779
2011/0089698 A1  4/2011  Ahmadi
2012/0228963 A1  9/2012  Ursu et al.
2017/0259809 A1 * 9/2017  Sakamoto ............. B60W 20/20
2018/0009321 A1 * 1/2018  Ricci .................... B60L 11/1809

FOREIGN PATENT DOCUMENTS

WO         2013010550 A1    1/2013

* cited by examiner

*Primary Examiner* — James A Shriver, II
*Assistant Examiner* — James J Triggs
(74) *Attorney, Agent, or Firm* — Scheinberg & Associates, P.C.; Michael O. Scheinberg

(57) ABSTRACT

An electric vehicle receives propulsion power from two sources of Static, stored, electric power and three sources of Dynamic, generated electric power. The two stored sources are a Battery and a supercapacitor system. The three sources of Dynamic power are: (1) Regenerative power in both the braking, deceleration phase of travel, the downward slope of travel over some extended distance, and part of cruise control; (2) Power from a modified Squirrel Cage Generator; and (3) Power through the solar silicon panels. The Static and Dynamic powers are fed into the current Consolidator, Distributer, and Controller (CDC) systems to provide electric power to the drive motors. The total distance travelled is the sum of the Static, stored power plus the generated power of the Dynamic system.

17 Claims, 5 Drawing Sheets

A ACCELERATION
B CRUSING VELOCITY
C DECELERATION

TOTAL ELECTRICAL VEHICLE

TECHNICAL FIELD OF THE INVENTION

The present invention relates to a Total Electrical Vehicle (TEV) powered by two sources of Static, stored power and three sources of Dynamic electrical power generated through the innovative harnessing of renewable resource systems.

BACKGROUND OF THE INVENTION

Both economic and environmental factors are driving an increasing emphasis on non-fossil fuel-powered vehicles, both automobiles and trucks. In particular, various electric vehicles are the preferred choice—either hybrids (having both electric and fossil-fuel propulsion), and now increasingly total electric vehicles (which operate only on electric motor propulsion). However, there is not yet the vast support infrastructure for electric vehicles (charging stations) that there is for fossil-fueled vehicles (gas/diesel stations). Thus, in many parts of the country, an electric vehicle must be able to travel distances greater than a hundred or even two-hundred miles in order to reach the next charging station, unlike the common situation for fossil-fueled cars having a gas/diesel station almost always within at most a few miles.

In today's society, both in the U.S. and even more so in Asia and Europe, there is an increasing emphasis on finding structures and methods for increasing the travel ranges of electric vehicles. More sophisticated batteries (such as lithium-ion) are being developed and now manufactured in "mega factories", thus through economies of scale, prices are expected to drop precipitously in the next few years. Other efforts at increasing the power and efficiency of electric motors (e.g., with stronger rare-earth magnets) are also underway and making good progress. In view of this situation, any developments which may improve the power storage capability (within the limited volume available in a vehicle) and/or provide additional sources of energy during motion of a vehicle, may be of great value for increasing the travel ranges of cars and trucks, and thus in hastening the day when only electric vehicles travel our roads and highways.

SUMMARY OF THE INVENTION

An object of the invention is to provide an electrical powered vehicle.

The stored electric power is divided into two sources:
1. A Battery, preferably a Lithium Ion battery; and
2. A supercapacitor device.

The total stored power is apportioned about 75/25 with the supercapacitor in the lead. The Battery provides for a stable, robust, long lasting power source and the supercapacitor provides a more agile, quick charging entity, and serves as a trickle charging circuit for the Battery. Power is normally drawn from the supercapacitor to the Consolidator, Distributor, and Controller (CDC) system housed in a Computer. When the supercapacitors' power is reduced to zero the system reverts to Battery only plus any of the dynamic sources of power.

The dynamic power is produced by three systems:
1. Regenerative power in the deceleration or negative angle phases of travel and through the cruise control system;
2. Direct power provided through an innovative, modified Squirrel Cage Generator with innovative, with a ramp guide; and
3. Direct power is provided through Silicon solar panels mounted on the hood, roof, or trunk (or a combination of the three).

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF EMBODIMENTS

The Total Electric Vehicle 100 includes a static, stored electrical power system 102 that is provided by two separate systems:
1. a Battery 104; and
2. a supercapacitor device 106.

The Battery 104 provides approximately 25% of the total and is composed of the latest technology (Lithium-Ion for now). The supercapacitor 106 network also is composed of the latest technology and comprises—75% of stored power. These two systems define the minimum distance for the propulsion of the TEV 100. The supercapacitor device 106 provides the initial start-up power for the TEV 100: has the capability of receiving charging power from a Concentrator Distributor Controller (CDC) 108; provides a trickle charge circuit to the Battery 104; has the ability to quickly respond to variable power requirements; and can be completely discharged with no adverse effects. Note: The Static, stored power system 102 may be replaced with a new electrical storage device currently being developed by Dr. Goodenough at the University of Texas at Austin.

Figure 1:
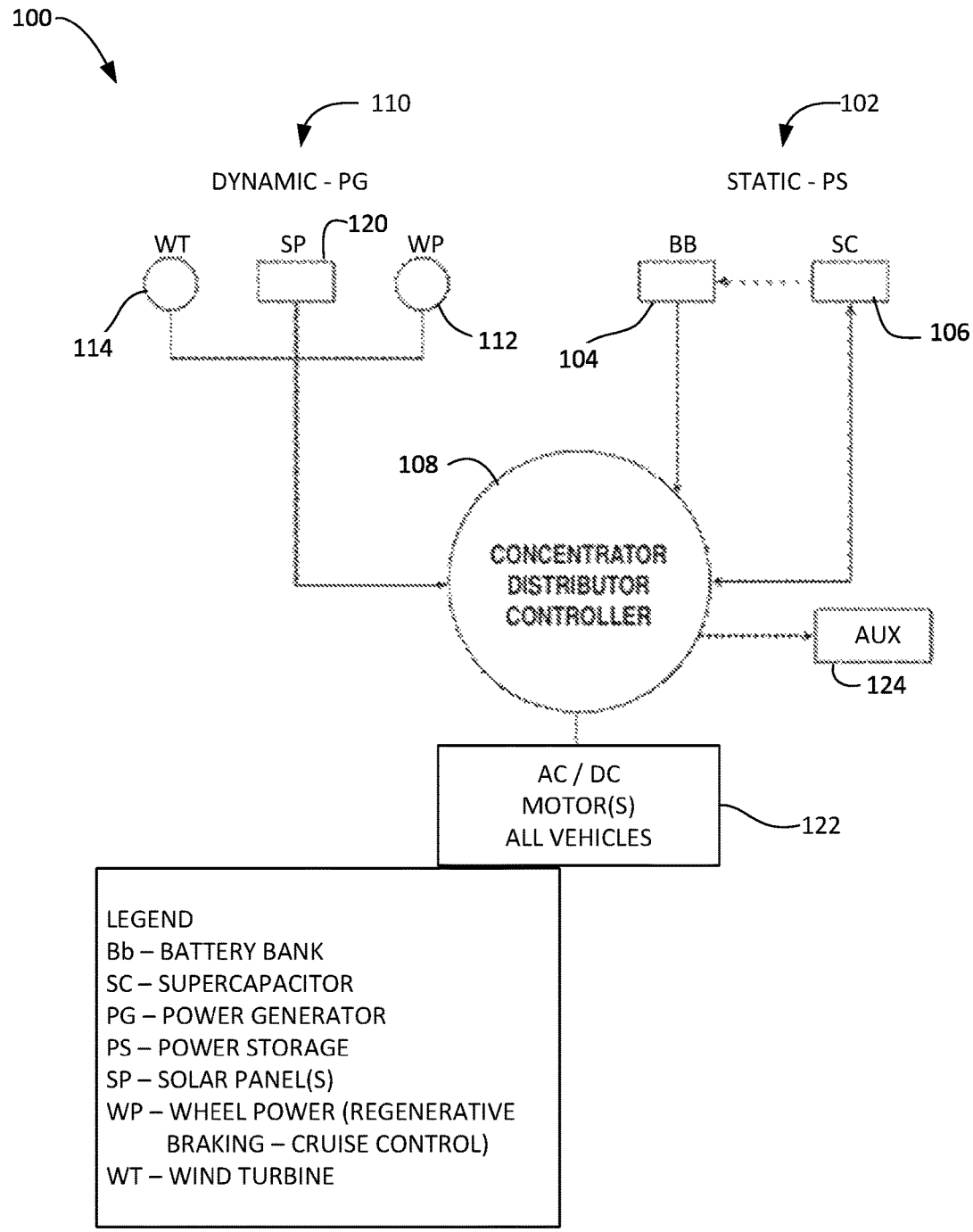
FIG. 1 is a drawing that provides a pictorial view of the systems that comprise the TEV: the two sources of Static, stored power; the three Dynamic sources of generated power; and the Consolidation, Distribution, Controller functions that are part of all electrical powered vehicles.
Figure 2:
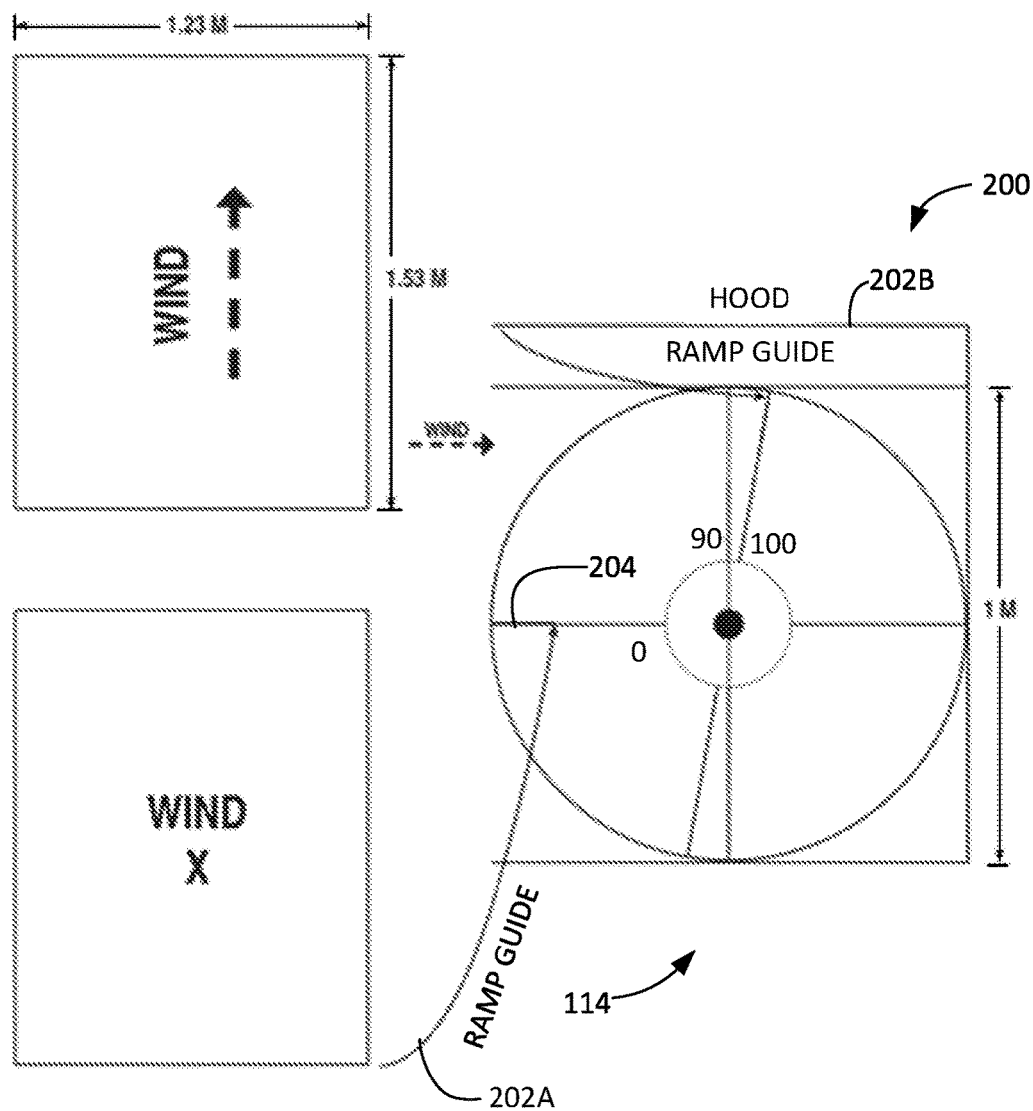
FIG. 2 is a drawing that provides the detail of the innovative, modified Squirrel Cage Generator with a ramp guides at the 0° and 100° points.
Figure 3A:
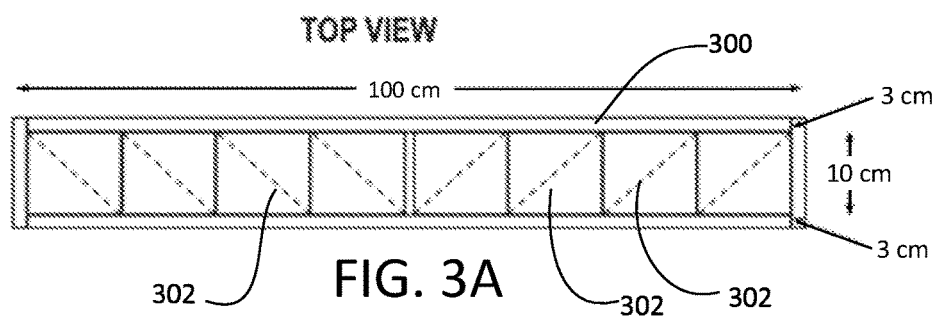
FIGS. 3A, 3B, and 3C are a top view, front view, and side view, respectively, of a screened, metal frame, vanes, Actuator with the sensors that protects the blades and generators.
Figures 3B, 3C:
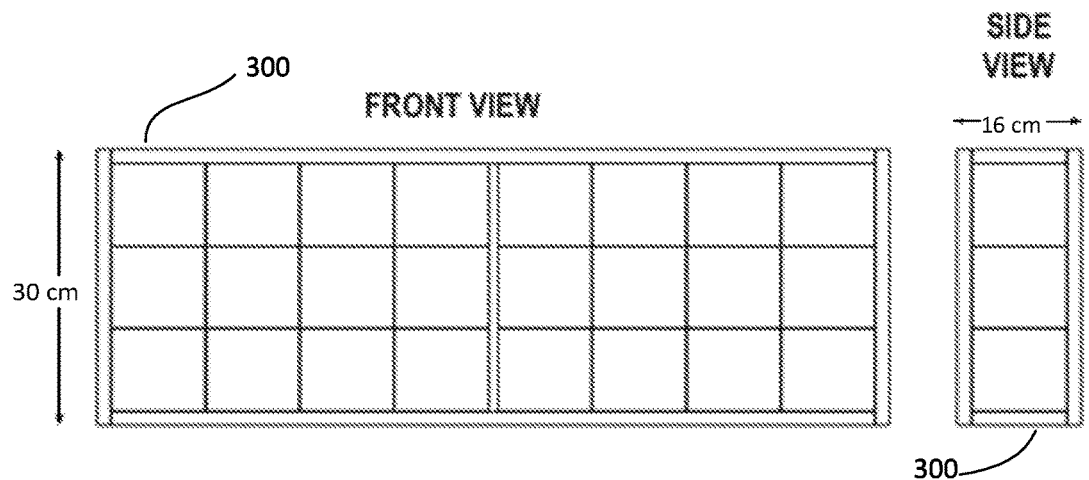

The Dynamic electrical generation systems 110 are:

1. A Regenerative system 112 that employs the latest technology for operation. This system is normally used in the deceleration phase of travel but can be used when the TEV 100 is going down-hill for long periods (part of cruise control);
2. Power through an innovative, modified Squirrel Cage Generator 200 (FIG. 2) that uses a ramp guide 202B to direct the wind to the perpendicular position of the zero-degree blade 204 in the 90-degree portion of the generation cycle of the wind turbine 114 (FIG. 1). This significantly increases the efficiency of the Squirrel Cage Generator 200 and provides the electrical power by the equation Watts=½ the air density× the area swept by the blades×velocity of the wind cubed: $w=p/2 \times A^2 \times V^3$. The ramp guide 202A and 202B, as shown in FIG. 2, has a significant impact on the system. The initial ramp guide 202A extends from the lowest point above ground to the zero-degree line and provides two significant functions: it greatly extends the effectiveness of the blades; and blocks the wind from impacting the lower half of the Squirrel Cage Generator 200. FIGS. 3A, 3B, and 3C. Screened, sturdy metal frame 300 with adjustable metal vanes 302 and housing the Actuator (not shown) that monitors and controls the actions. There are three sensors (not shown) installed on the vehicle: pressure; velocity; and air density. If any of these three sensors detect damaging limits, then the vanes 302 close to shunt the wind to both ends of the frame. There are three levels for the limits: low; medium; and high. The vanes 302 are tied in tandem so that they close equally on the left and right at the same time. The low limit starts at the ends and progresses to the center. The Actuator monitors and controls the action to be applied through a small computer. The sturdy frame 300 is attached to the vehicle chassis for extra strength.
3. Power through solar silicon panels 120 that can be installed on the hood, roof, or trunk.

The CDC 108 serves as the housing for the electrical power of the TEV plus the Controller functions found in all electrical vehicles. The CDC 108 functions to consolidate the electrical power from the Static, stored power system 102 as well the Dynamic, generated systems 110. It provides an interface with the Static and Dynamic systems to insure electric power is available for the drive motors 122 and provides operational data to the large Computer (not shown). The Monitor and Control functions for the entire TEV 100 are also housed here.

Figure 5:
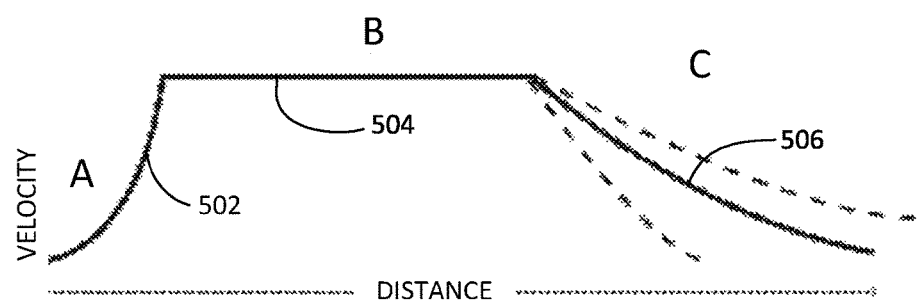
FIG. 5 is a drawing of the three phases of travel with the first two being a function of Newton's first Law of inertia. The first phase is Acceleration with the body at rest and needing some outside force to complete the cycle. The second phase is Cruising and needs some outside force to stop the action (neglecting decelerating effects of air resistance). The third phase is Deceleration that will bring the vehicle to a complete stop.

The three phases of travel are shown in FIG. 5. The first two phases follow Newton's first Law of Inertia:

1. A body at rest remains at rest unless acted upon by some outside source; and
2. A body in motion remains in motion unless acted by some outside source.

The two Static, stored power sources of system 108 provide the initial power for Acceleration 502, primarily through the supercapacitor. As the speed reaches the cut-in point for the Squirrel Cage Generator, nominally at 20 mph, this power is added to the Acceleration Phase 502. And, if the initial phase is started in the daylight hours this solar power is also added to the Acceleration. The supercapacitor 106 continues to provide power until it is exhausted at which point the Battery Bank 104 cuts in. When the Cruising Phase 504 is reached the Squirrel Cage Generator 200 is at some high level of power with the Battery Bank 104 providing power as needed. The cruising action of the regenerative Braking may also provide additional power. In the Deceleration Phase 506 the Regenerative Braking takes over with the Squirrel Cage 200 reducing its power. Again, if the climatic conditions are favorable solar power is also added. All electric power generated in this Phase is directed to the supercapacitor device 106.

Flow Diagram of Power Flows within the TEV

FIG. 1. A Functional Flow Diagram showing the two sources of Static, stored electrical power and the three sources of Dynamic power that flow into the CDC 108 that feeds into the AC or DC drive motors 122. The Aux. systems 124 are also provided with electrical power. The three dynamic power sources 110 are at the upper left, and the two power storage systems 102 at the upper right. The CDC module 108 couples the power flows from all five power sources into the AC/DC motors 122 which are typical to an all-electric vehicle, as well as providing power for auxiliary requirements (heat, A/C, radio, defrost, etc.)

Squirrel Cage Power Generator

FIG. 2. Provides details of the modified Squirrel-Cage Generator (MSG) 200 with the Ramp Guide 210A and 210B at the 0, and 100 degree points, respectively, of wind turbine 114. This allows the wind to be perpendicular to the blades at two points: 0° and 90°. The total electrical power generated will need to be determined through empirical means in the Prototype phase of development.

Enclosure for Squirrel Cage Generator

FIGS. 3A, 3B, and 3C. Screened, sturdy frame 300 with wind deflectors 302. The frame is attached to vehicle chassis (not shown) and provides some support in the event of a head-on collision.

Squirrel Cage Generator Front View

Figure 4:
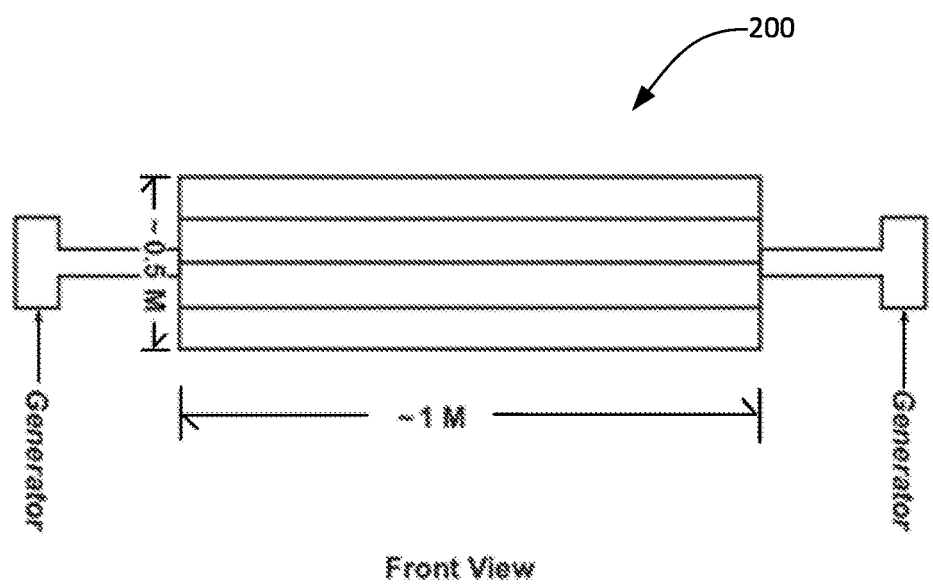
FIG. 4 is a drawing of the Squirrel Cage Generator with all dimensions shown as approximates that will vary with the model of vehicle chosen. It shows the two generators attached at the ends of the rotor.

FIG. 4. A front view of the Squirrel Cage Generator 200 with dimensions shown as approximate to accommodate the model of vehicle chosen. It may be possible to size the generator to the class of vehicle, i.e. economy to ATV.

Phases of Travel for a Typical Trip

FIG. 5. Phases of Travel for a typical trip. The MSG provides wind power from the cut-in speed of Acceleration 502 to the end of Deceleration 506. Solar power is provided in all Phases during daylight hours. The Deceleration Phase provides electrical power through the end of speed of the MSG plus the Regeneration Braking cycle and as part of Cruise control.

A preferred method or apparatus of the present invention has many novel aspects, and because the invention can be embodied in different methods or apparatuses for different purposes, not every aspect need be present in every embodiment. Moreover, many of the aspects of the described embodiments may be separately patentable. The invention has broad applicability and can provide many benefits as described and shown in the examples above. The embodiments will vary greatly depending upon the specific application, and not every embodiment will provide all of the benefits and meet all of the objectives that are achievable by the invention.

In the following discussion and in the claims, the terms "including" and "comprising" are used in an open-ended fashion, and thus should be interpreted to mean "including, but not limited to . . . ." To the extent that any term is not specially defined in this specification, the intent is that the term is to be given its plain and ordinary meaning. The accompanying drawings are intended to aid in understanding the present invention and, unless otherwise indicated, are not drawn to scale.

The various features described herein may be used in any functional combination or sub-combination, and not merely those combinations described in the embodiments herein. As such, this disclosure should be interpreted as providing written description of any such combination or sub-combination.

Although the present invention and its advantages have been described in detail, it should be understood that various changes, substitutions and alterations can be made to the embodiments described herein without departing from the scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. An electric propulsion wheeled vehicle, comprising:
   electric drive motors, configured to provide torque to two or more of the wheels of the vehicle;
   a multiplicity of static power sources that store energy and provide the stored energy to the electric drive motors;
   a multiplicity of dynamic power sources that generate power, the dynamic power sources including a squirrel cage generator that includes a ramp guide to direct the wind to the perpendicular position of the zero-degree blade in the 90-degree portion of the generation cycle to improve efficiency of the squirrel cage generator; and
   a CDC system, configured to consolidate, distribute and control, the power flow from the static and dynamic power sources to the electric drive motors.

2. The electric propulsion vehicle of claim 1, wherein the static power sources comprise a high power-density battery.

3. The electric propulsion vehicle of claim 2, wherein the high power-density battery comprises a lithium-ion battery.

4. The electric propulsion vehicle of claim 1, wherein the static power sources comprise a supercapacitor.

5. The electric propulsion vehicle of claim 1, wherein the dynamic power sources comprise a regenerative power system.

6. The electric propulsion vehicle of claim 1, wherein the dynamic power sources comprise a multiplicity of solar cells.

7. The electric propulsion vehicle of claim 6, wherein a portion of the multiplicity of solar cells is located on the hood of the vehicle.

8. The electric propulsion vehicle of claim 6, wherein a portion of the multiplicity of solar cells is located on the roof of the vehicle.

9. The electric propulsion vehicle of claim 6, wherein a portion of the multiplicity of solar cells is located on the trunk of the vehicle.

10. The electric propulsion vehicle of claim 1, further comprising sensors for air pressure, vehicle velocity and air density.

11. The electric propulsion vehicle of claim 10, wherein the sensors generate signals which enable the CDC to control the operation of the squirrel cage generator.

12. The electric propulsion vehicle of claim 1, wherein the total travel distance of the vehicle is determined by the amount of electrical power stored in the static power sources added to the power generated during vehicle travel from the dynamic power sources.

13. An electric propulsion wheeled vehicle, comprising:
    electric drive motors, configured to provide torque to one or more of the wheels of the vehicle;
    a multiplicity of static power sources, including:
      a high power-density battery; and
      a supercapacitor;
    a multiplicity of dynamic power sources, including:
      a regenerative power system;
      a squirrel cage generator; and
      a multiplicity of solar cells; and
    a CDC system, configured to consolidate, distribute and control, the power flow from the static and dynamic power sources to the electric drive motors,
    wherein the squirrel cage generator includes a ramp guide to direct the wind to the perpendicular position of the zero-degree blade in the 90-degree portion of the generation cycle to improve efficiency of the squirrel cage generator.

14. The electric propulsion vehicle of claim 13, wherein the multiplicity of solar cells is located on one or more of the hood, roof, and trunk of the vehicle.

15. The electric propulsion vehicle of claim 13, further comprising sensors for air pressure, vehicle velocity and air density.

16. The electric propulsion vehicle of claim 15, wherein the sensors generate signals which enable the CDC to control the operation of the squirrel cage generator.

17. The electric propulsion vehicle of claim 13, wherein the total travel distance of the vehicle is determined by the amount of electrical power stored in the static power sources added to the power generated during vehicle travel from the dynamic power sources.

* * * * *